(12) United States Patent
Hou

(10) Patent No.: US 8,767,365 B2
(45) Date of Patent: Jul. 1, 2014

(54) PROTECTION CIRCUIT

(75) Inventor: Chuan-Tsai Hou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 378 days.

(21) Appl. No.: 13/171,655

(22) Filed: Jun. 29, 2011

(65) Prior Publication Data

US 2012/0293899 A1    Nov. 22, 2012

(30) Foreign Application Priority Data

May 20, 2011    (TW) .............................. 100117877 A

(51) Int. Cl.
    *H02H 7/00*    (2006.01)
(52) U.S. Cl.
    USPC ........................................................... 361/86
(58) Field of Classification Search
    USPC ........................................................... 361/86
    See application file for complete search history.

(56) References Cited

U.S. PATENT DOCUMENTS

| | | | |
|---|---|---|---|
| 7,403,021 B2 * | 7/2008 | Tan et al. ....................... | 324/679 |
| 7,586,345 B2 | 9/2009 | Kim | |
| 7,876,000 B2 * | 1/2011 | Chiu et al. .................... | 307/140 |
| 8,344,702 B2 * | 1/2013 | Sun et al. ...................... | 320/163 |
| 2010/0045117 A1 | 2/2010 | Hou | |

FOREIGN PATENT DOCUMENTS

| | | |
|---|---|---|
| CN | 101119021 C | 2/2008 |
| CN | 201242720 Y | 5/2009 |
| CN | 101656414 C | 2/2010 |

* cited by examiner

*Primary Examiner* — Stephen W Jackson
(74) *Attorney, Agent, or Firm* — Novak Druce Connolly Bove + Quigg LLP

(57) ABSTRACT

A protection circuit includes an electronic switch and a comparator. The comparator includes a positive input connected to a first power supply, a negative input connected to an output power supply, and an output connected to a first terminal of the electronic switch through a first resistor. A second terminal of the electronic switch is connected to a device. A third terminal of the electronic switch is connected to the output power supply. When a voltage on the positive input is greater than a voltage on the negative input, the comparator outputs a high level signal to turn on the electronic switch, the output power supply powers the device. When the voltage on the positive input is less than the voltage on the negative input, the comparator outputs a low level signal to turn off the electronic switch, the output power supply does not power the device.

3 Claims, 1 Drawing Sheet

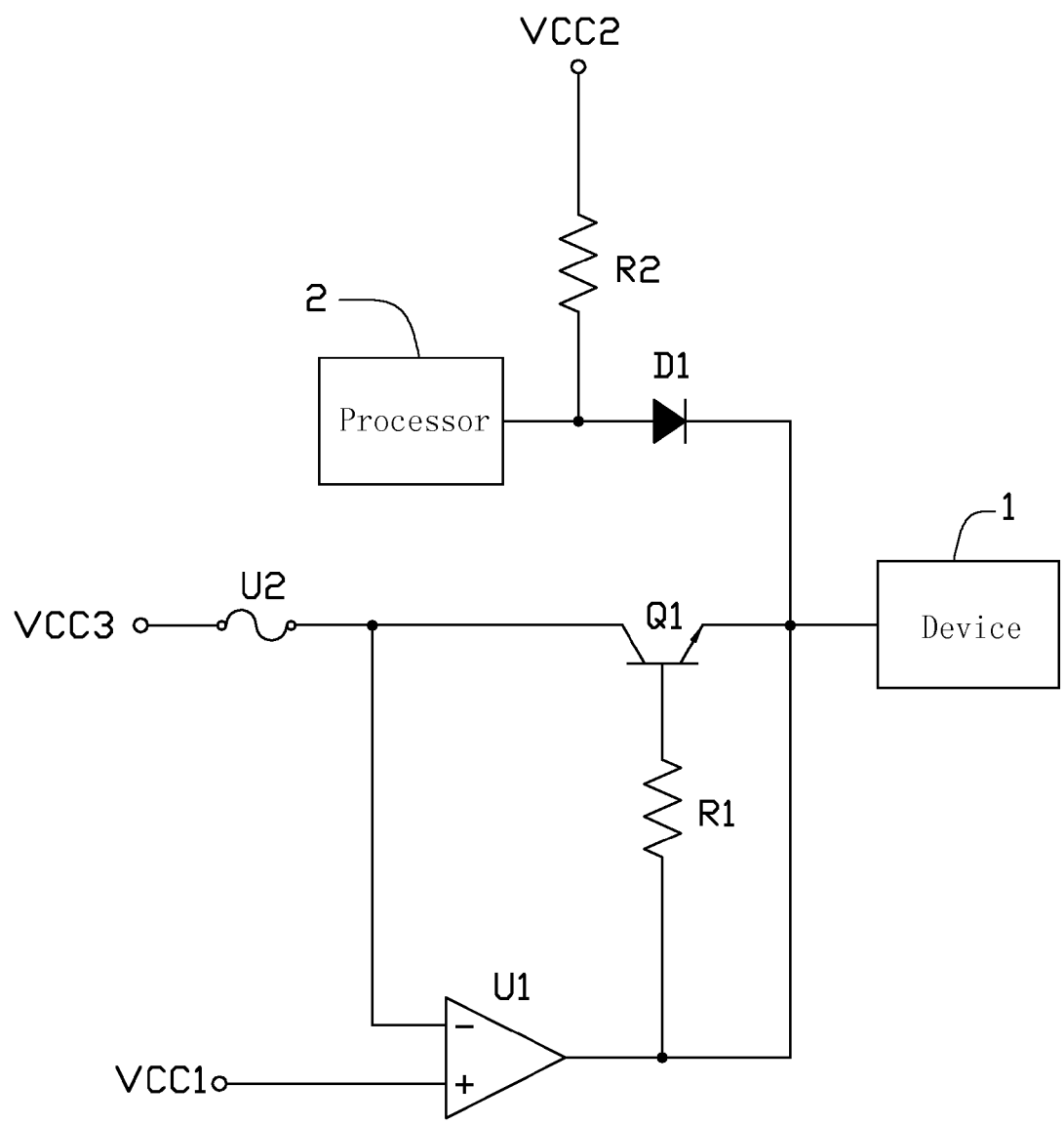

PROTECTION CIRCUIT

BACKGROUND

1. Technical Field

The present disclosure relates to a protection circuit.

2. Description of Related Art

A conventional protection circuit used for universal serial bus (USB) devices usually use resistors as voltage dividers. However, resistances of the resistors must be determined or calculated to make the voltage received by the USB devices conform to the requirements of the USB devices. This is inconvenient.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

The FIGURE is a circuit diagram of an exemplary embodiment of a protection circuit.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Referring to the FIGURE, an exemplary embodiment of a protection circuit includes a comparator U1, a diode D1, a fuse U2, a first power supply VCC1, a second power supply VCC2, a transistor Q1, and two resistors R1 and R2.

A negative input of the comparator U1 is connected to an output power supply VCC3 through the fuse U2. A positive input of the comparator U1 is connected to the first power supply VCC1. An output of the comparator U1 is connected to a base of the transistor Q1 through the resistor R1. A collector of the transistor Q1 is connected to the negative input of the comparator U1. An emitter of the transistor Q1 is used to output power to a device 1, such as a universal serial bus device.

The emitter of the transistor Q1 is further connected to a cathode of the diode D1. An anode of the diode D1 is connected to a processor 2. The anode of the diode D1 is further connected to the second power supply VCC2 through the resistor R2. The anode of the diode D1 is used to output an overvoltage signal to the processor 2 when the output power supply 3 does not meet the requirement of the device 1.

A voltage of the first power supply VCC1 equals to a normal working voltage of the device 1. A voltage of the second power supply VCC2 is less than a voltage of the output power supply VCC3.

When the voltage of the output power supply VCC3 meets the requirement of the device 1, voltage at the negative input and the positive input of the comparator U1 are the same. The comparator U1 outputs a high level signal. The transistor Q1 is turned on, and outputs power from the output power supply VCC3 to the device 1. Moreover, because a voltage at the anode of the diode D1 (namely the voltage of the second power supply VCC2) is less than a voltage at the cathode of the diode D1 (namely the voltage of the output power supply VCC3), the diode D1 is turned off. The processor 2 receives a high level signal.

When the voltage of the output power supply VCC3 is beyond the requirement of the device 1, the voltage on the positive input of the comparator U1 is less than the voltage on the negative input of the comparator U1. As a result, the output of the comparator U1 outputs a low level signal. The transistor Q1 is turned off, and does not output power to the device 1. Moreover, because the voltage at the anode of the diode D1 (namely the voltage of the second power supply VCC2) is greater than the voltage at the cathode of the diode D1 (namely the voltage of the output of the comparator U1), the diode D1 is turned on. The processor 2 receives a low level signal, and notifies the user that the output power supply 3 is beyond the requirement of the device 1. In addition, the fuse U2 is fusing to disconnect the output power supply VCC3 and the protection circuit.

In other embodiments, the transistor Q1 can be replaced with other type of transistors, such as, an n-channel metal-oxide semiconductor or a p-channel metal-oxide semiconductor transistor.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A protection circuit for a device powered by an output power supply, the protection circuit comprising:
    an electronic switch;
    a comparator comprising a positive input connected to a first power supply, a negative input connected to the output power supply, and an output connected to a first terminal of the electronic switch through a first resistor; wherein a second terminal of the electronic switch is connected to the device, a third terminal of the electronic switch is connected to the negative input;
    a diode; and
    a processor, wherein an anode of the diode is connected to the processor, a cathode of the diode is connected to the output of the comparator, the anode of the diode is further connected to a second power supply through a second resistor, the diode outputs an overvoltage signal to the processor when the voltage on the positive input is greater than the voltage on the negative input of the comparator; and
    wherein when a voltage on the positive input is greater than a voltage on the negative input of the comparator, the comparator outputs a high level signal to turn on the electronic switch, thus the output power supply outputs power to the device; when the voltage on the positive input is less than the voltage on the negative input of the comparator, the comparator outputs a low level signal to turn off the electronic switch, the output power supply does not output power to the device.

2. The protection circuit of claim 1, further comprising a fuse connected between the output power supply and the negative input of the comparator.

3. A protection circuit for a device powered by an output power supply, the protection circuit comprising:

an electronic switch;

a comparator comprising a positive input connected to a first power supply, a negative input connected to the output power supply, and an output connected to a first terminal of the electronic switch through a first resistor; wherein a second terminal of the electronic switch is connected to the device, a third terminal of the electronic switch is connected to the negative input; and a fuse connected between the output power supply and the negative input of the comparator;

wherein when a voltage on the positive input is greater than a voltage on the negative input of the comparator, the comparator outputs a high level signal to turn on the electronic switch, thus the output power supply outputs power to the device; when the voltage on the positive input is less than the voltage on the negative input of the comparator, the comparator outputs a low level signal to turn off the electronic switch, the output power supply does not output power to the device.

\* \* \* \* \*